United States Patent [19]
Williams

[11] 3,898,798
[45] Aug. 12, 1975

[54] SUBLIMING SOLIDS BIPROPELLANT FUEL SYSTEM POWER GENERATOR

[75] Inventor: Laurence O. Williams, Littleton, Colo.

[73] Assignee: Martin Marietta Corporation, New York, N.Y.

[22] Filed: Oct. 26, 1972

[21] Appl. No.: 301,185

Related U.S. Application Data

[63] Continuation-in-part of Ser. No. 677,093, Oct. 23, 1967, abandoned.

[52] U.S. Cl. ................... 60/207; 60/211; 60/218; 60/219; 149/36; 60/203; 60/253
[51] Int. Cl. ........................ C06d 5/08; C06d 5/10
[58] Field of Search ............ 60/218, 219, 220, 206, 60/203, 204, 211, 252, 253; 149/74, 75, 36

[56] References Cited
UNITED STATES PATENTS

| | | | |
|---|---|---|---|
| 3,066,479 | 12/1962 | Koch | 149/36 |
| 3,373,563 | 3/1968 | McCabe | 60/203 |
| 3,407,604 | 10/1968 | Keith et al. | 60/219 |
| 3,471,106 | 10/1969 | Maes | 60/271 |

*Primary Examiner*—Benjamin R. Padgett
*Attorney, Agent, or Firm*—Max L. Wymore; Phillip L. DeArment

[57] ABSTRACT

A generator using a bipropellant fuel system for producing usable power from solid reactants which are sublimed as required to produce vapors and the vapors are chemically reacted to release stored energy and convert same to useful work.

12 Claims, 1 Drawing Figure

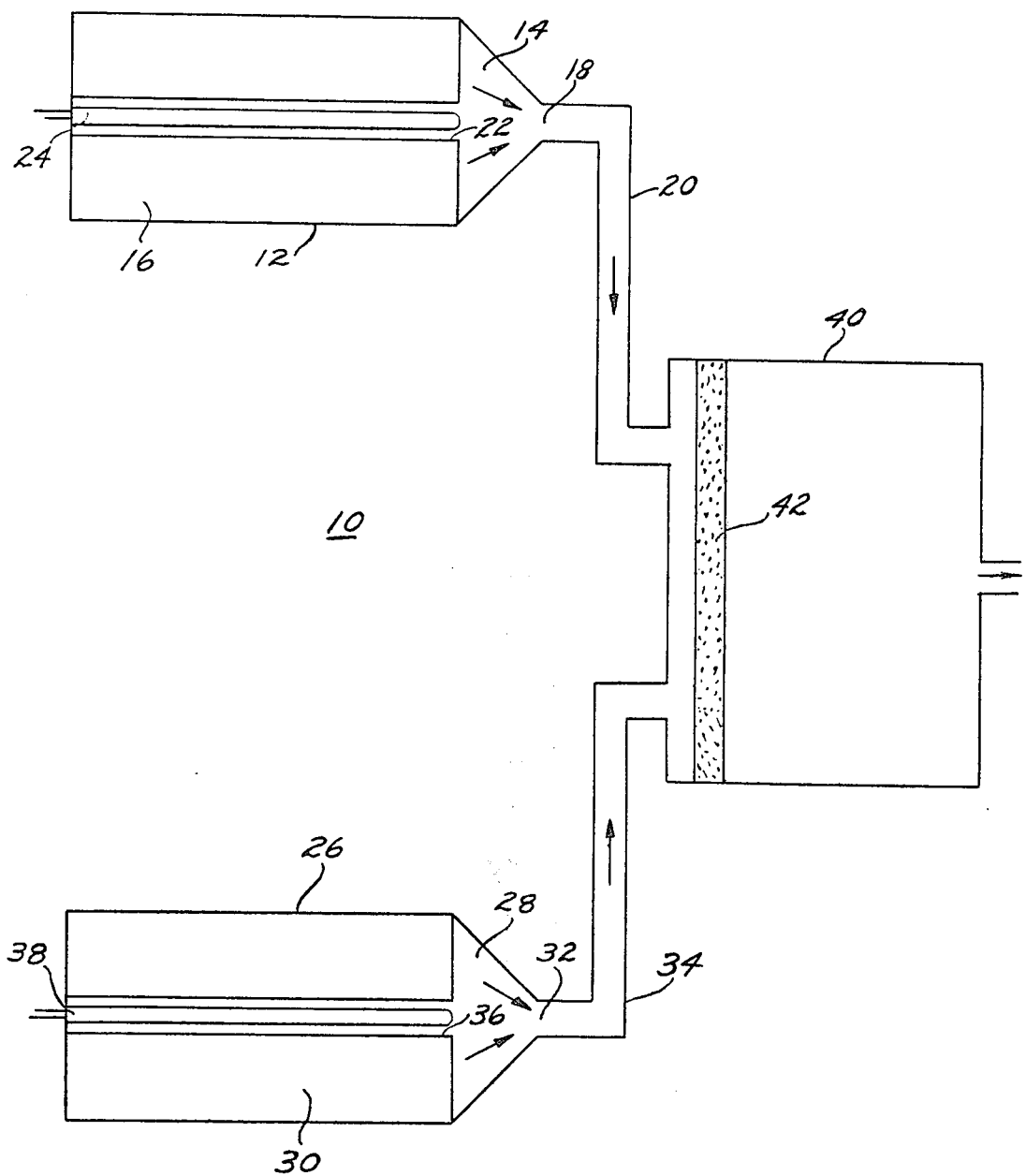

SUBLIMING SOLIDS BIPROPELLANT FUEL SYSTEM POWER GENERATOR

This application is a continuation-in-part of my application, Ser. No. 677,093, filed Oct. 23, 1967 now abandoned, for "SUBLIMING SOLIDS GAS GENERATOR WITH CHEMICAL REACTION AUGMENTATION."

Subliming solids gas generators have as one interesting use to provide the working fluid for the propulsion by rocket motors. Subliming solid rocket motors are of considerable interest for use in space systems because of the potential high reliability which results from their total or substantial lack of moving parts, and the absence of zero gravity liquid management problems. The development and application of subliming fuel rocket motors has been hindered in the past, however, due to their low performance. This has resulted from the available fuels having low specific impulse characteristics and high power input requirements to convert the fuel from the solid to gaseous state. Also, the exhaust products from the gas generator tended to recondense and deposit in the exhaust channel to further reduce the overall efficiency.

When rocket motors are used in the attitude control systems of spacecraft and satellites, they are not required to have a large amount of thrust to perform the task of performing relatively small movement maneuvers in a space environment. The low thrust requirement could be satisfied by the use of small motors based on the sublimation of solids under the influence of heat within the confines of an enclosed space and passing the gases exhausting therefrom through a nozzle or other energy conversion device to a lower energy level to produce useful work. It is desirable to have a minimum power input requirement to generate the vapors from the solid.

It is an object of this invention to provide a subliming solids power generator which avoids one or more of the disadvantages of the prior art arrangements and has increased efficiency.

It is another object of this invention to provide a subliming solids rocket motor having a family of fuels wherein the vapor products of sublimation are chemically reactive to provide the release of additional useful energy.

It is a further object of this invention to provide a power generator wherein the fuel and the oxidizer are solid and have a substantially infinite storage life.

It is still a further object of this invention to provide a subliming solids rocket motor wherein the recondensation of the solid fuel after vaporization is virtually eliminated.

A further object of the present invention is to provide a rocket motor which is not complicated, easy to operate, relatively inexpensive to manufacture and highly efficient.

In accordance with the invention, the subliming solids power generator comprises a first chamber having an outlet conduit, a completely solid fuel devoid of liquid, contained within said chamber which fuel is adapted to sublime with the application of heat, means for applying heat to the fuel, a second chamber having an outlet conduit, a solid oxidizer contained within said chamber which oxidizer is adapted to sublime with the application of heat, means for applying heat to the oxidizer, said outlet conduits of said chambers being connected, means positioned in the outlet conduits adapted to effect the catalytic or noncatalytic decomposition of the sublimation products of the fuel and oxidizer as these products are exhausted from the chambers, mixed and passed through the outlet conduits with the reaction of the sublimation products being an exothermic reaction. The invention further contemplates an energy conversion device such as a rocket nozzle, gas turbine, fuel cell and the like connected to receive the gases issuing from the chamber outlet to convert the energy stored therein to useful work. The invention further contemplates the provision of means to produce sublimation and catalytic or noncatalytic conversion of the fuel on demand.

For a better understanding of the present invention, together with other and further objects thereof, reference is had to the following description taken in connection with the accompanying drawing and its scope will be pointed out in the appended claims.

Referring to the drawing, the FIGURE is a diagrammatic representation of the power generator of this invention.

The fuels utilized in sublimed solids rocket motors need only be a solid with a sublimation vapor pressure which is reasonably high under feasible temperatures. The performance of these rockets is nevertheless governed by the same parameters as any other rocket. The specific impulse Isp is given by:

$$Isp = K \frac{T}{(M)}^{1/2} \qquad (1)$$

where
K is a constant
T is the temperature and
M is the molecular weight of the exhaust gas.

In the previous art of these rocket motors, the temperature of the exhaust gases is limited by the heat input energy and the molecular weight is determined by the fuel selected. In practice, fuel specific impulses ranging from about 20 to about 50 seconds are obtained using ammonium carbonate, ammonium hydrosulfide, and the like, as fuels. Where a monopropellant fuel is used which, in addition to containing the energy input for the fuel sublimation, provides additional energy produced by a heat producing chemical decomposition or reaction, there is found to be a 5 to 10 fold increase in the performance of the rocket motors for the same level of simplicity and reliability. Where, in addition, an oxidizer is provided which reacts with the fuel, the increase in available power output is increased even further.

The FIGURE illustrates one form which the power generators embodying the present invention may take. The generator 10 is seen to include a fuel chamber 12 of cylindrical or other suitable configuration enclosing a space 14 containing a solid block of fuel 16, devoid of liquid, which may be of annular cross section to leave space 14 unfilled centrally of chamber 12. Chamber 12 has an axially positioned opening 18 through one end thereof. Attached to chamber 12 by suitable means in substantial axial alignment with opening 18 in chamber 12 is a gaseous fuel feed line. The solid fuel may be provided with an axial bore 22 therethrough into which is positioned an electric heater 24 and the like similar to but not limited to the shielded quartz type such as the Glo-Quartz heater available from Aloe Scientific, Model Number V 49485. In a similar fashion there is provided an oxidizer chamber 26 of cylindrical or other configuration enclosing a space 28 containing a solid block of oxidizer 30, devoid of liquid, which may be of annular cross section to leave space 28 unfilled centrally of chamber 24. Chamber 26 also has an axially positioned opening 32 through one end thereof. Attached to the chamber 26 by suitable means in substantial axial alignment with opening 32 in chamber 26 is a gaseous oxidizer feed line 34. The solid oxidizer may be provided with an axial bore 36 therethrough into which is positioned an electric heater 38.

The gaseous fuel feed line 20 and the gaseous oxidizer feed line 34 are connected to feed gaseous fuel and oxidizer to a power generation device 40 which may be a rocket motor 6, a fuel cell or the like containing a catalyst 42 to catalyze the reaction between the fuel and oxidizer. The fuel may conveniently be a single mass of solid amminium azide and the oxidizer a single mass of solid nitrogen pentoxide both devoid of liquid. Both these solids have high vapor pressures at room temperature and can easily be converted to the gaseous state by the application of heat. When the two gases are brought together in the presence of a catalyst they will react to produce energy by the following reaction:

1.

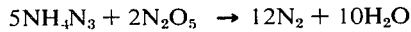

$$5NH_4N_3 + 2N_2O_5 \rightarrow 12N_2 + 10H_2O$$

This reaction in a rocket motor produces thrust with a fuel vacuum impulse of from 310 to 340 seconds. In an electrical fuel cell the reaction will produce a maximum of 813 watt-hours per pound of fuel and oxidizer expended.

The solid fuel and oxidizer can be held in a space craft at low temperatures without the use of valves. The usual liquid management problems under zero gravity are also not present. To start operation a small amount of energy is supplied from a battery or other source, not shown to heaters 24 and 36. This small increment of energy is utilized to volatilize the solids and the gases are directed to the power device for conversion to an energy form to produce useful work. The energy output can be varied over a wide range by varying the rate that heat is supplied to the solids. Suitable catalysts appear to be ruthenium, iron, cobalt, nickel, rhenium, rhodium and platinum with ruthenium being preferred and iron next, being less costly than ruthenium. The catalyst 42 is preferably in the form of a porous mat through which the vapors pass to react.

Theoretical propulsion parameters of a rocket motor calculated for gaseous ammonium azide and nitrogen pentoxide assuming an outside energy source to volatilize the fuel are:

TABLE 1

| Chamber pressure | 10 psi |
|---|---|
| Exit pressure | 0.05 psi |
| Chamber temperature | 2888°K (4738°F) |
| Exit temperataure | 1484°K (2212°K) |
| Expansion ratio | 21.6 |
| Optimum Isp | 303.8 sec |
| Vacuum Isp | 322.3 sec |

The system of Table 1 in boot-strap operation in which energy is fed back to volatilize more fuel and oxidizer would result in performance in the 290 to 310 Vacuum Isp range.

Suitable solid fuels and oxidizer all displaying high vapor pressures and suitably high melting points are:

TABLE II

| Fuels | Oxidizers |
|---|---|
| Ammonium Azide | Nitrogen Pentoxide |
| Ammonium Acetate | Nitronium Perchlorate |
| Hydrazine Azide | Iodine Pentafluoride |
| Azidoamine | Iodine Heptafluoride |
| Hydrazine Azide Hydrazinate | |
| Naphthylene | |

These may be used in substantially any combination.

Thus it is seen that the above as well as any solid having a relatively high vapor pressure which is sublimed at relatively low temperatures by the application of heat into vapors capable of a catalytically or noncatalytic induced exothermic reaction to produce a high temperature, relatively low molecular weight working fluid is a suitable fuel or oxidizer depending on its chemical nature for the bipropellant fuel system of this invention.

The power output from the rocket motor can be varied from very low thrust on the order of $10^{-4}$ pounds to as great as the structural materials will allow.

The fuel system according to this invention is thus seen to have high reliability as a result of the absence of liquids, moving parts, gases under pressure and low temperature vulnerability. In addition, the exhaust products are clean, i.e., nitrogen and water in the case of ammonium azide and nitrogen pentoxide. The fuel of the system can remain inactive in space for extended periods of time as during space cruising because the system can cool to any low temperature without ill effect.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A subliming solids bipropellant fuel system power generator which comprises:
   at least two gas-tight chambers each having an outlet conduit;
   a single mass of solid fuel devoid of liquid contained within one of said chambers which fuel is adapted to sublime with the application of heat to provide a gaseous medium;
   a single mass of solid oxidizer devoid of liquid contained in another of said chambers which oxidizer is adapted to sublime with the application of heat to provide a gaseous medium which will upon ignition react exothermicly with said fuel vapors to produce a high temperature gas fluid under pressure;
   means for supplying heat to said fuel and said oxidizer; and,
   means connected to said outlet conduits for conversion of the high temperature gas pressure to useful work.

2. The fuel system of claim 1 wherein the fuel is selected from the group consisting of ammonium azide, hydrazine azide, hydrazine azide hydrazinate, and azidoamine and the oxidizer is selected from the group consisting of nitrogen pentoxide, nitronium perchlorate, iodine pentafluoride and iodine heptafluoride.

3. The fuel system of claim 1 wherein the fuel is ammonium azide and the oxidizer is nitrogen pentoxide.

4. A subliming solids bipropellant fuel system power generator which comprises:
- at least two gas-tight chambers each having an outlet conduit;
- a single mass of solid fuel devoid of liquid contained in one of said chambers which fuel has a positive heat of formation and is adapted to sublime with the application of heat to provide a gaseous medium;
- a single mass of solid oxidizer devoid of liquid contained in another of said chambers which oxidizer is adapted to sublime with the application of heat to provide a gaseous medium which will react with said fuel vapors in the presence of a catalyst to produce a gas fluid under pressure;
- means for supplying heat to said fuel and said oxidizer;
- means connecting said outlet conduit means to form a common outlet means;
- catalyst means adapted to effect the catalytic ignition of the gaseous mediums on issuance and mixing thereof from said common outlet means to produce a high temperature working fluid; and,
- means connected to said common outlet means to convert the high temperature working fluid to useful work.

5. The fuel system of claim 4 wherein the fuel is selected from the group consisting of ammonium azide, hydrazine azide, hydrazine azide hydrazinate, and azidoamine and the oxidizer is selected from the group consisting of nitrogen pentoxide, nitronium perchlorate, iodine pentafluoride and iodine heptafluoride.

6. The fuel system of claim 4 wherein the fuel is ammonium azide and the oxidizer is nitrogen pentoxide.

7. The fuel system according to claim 4 wherein the means for supplying heat comprises an electric heater positioned within said gas chambers.

8. The fuel system of claim 4 wherein a catalyst is selected from the group consisting of ruthenium, iron, cobalt, nickel, rhenium, rhodium and platinum.

9. The fuel system of claim 6 wherein the catalyst is ruthenium.

10. The method of producing a high temperature working fluid from a solid fuel which comprises the steps of:
- providing a single mass of solid fuel devoid of liquid which has a positive heat of formation and is adapted to sublime with the application of heat to provide a gaseous medium;
- enclosing said fuel within a gas-tight chamber having an outlet;
- applying heat to said fuel in an amount sufficient to produce a gaseous medium with a pressure adequate to force the gases to issue from the chamber;
- providing a single mass of solid oxidizer devoid of liquid adapted to sublime with the application of heat to provide a gaseous medium adapted to hypergolicly react with said fuel and having a relatively high vapor pressure;
- applying heat to said oxidizer in an amount sufficient to produce a gaseous medium with a vapor pressure adequate to force the gases to issue from the chamber;
- passing the issuing fuel and oxidizer gases through a catalytic zone containing a catalyst adapted to decompose the gases with the release of heat to produce a high temperature working fluid; and,
- expanding said working fluid through a work conversion means to produce work.

11. The method of claim 10 wherein the fuel is selected from the group consisting of ammonium azide, hydrazine azide, hydrazine azide hydrazinate, and azidoamine, and the oxidizer is selected from the group consisting of nitrogen pentoxide, nitronium perchlorate, iodine pentafluoride and iodine heptafluoride.

12. The method of claim 10 wherein the fuel is ammonium azide and the oxidizer is nitrogen pentoxide.

* * * * *